United States Patent
Cognard

[11] 4,198,124
[45] Apr. 15, 1980

[54] ELECTRO-OPTIC DISPLAY DEVICE

[75] Inventor: Jacques Cognard, Areuse, Switzerland

[73] Assignee: Ebauches, S.A., Neuchatel, Switzerland

[21] Appl. No.: 768,380

[22] Filed: Feb. 14, 1977

Related U.S. Application Data

[63] Continuation-in-part of Ser. No. 685,094, May 10, 1976, abandoned, which is a continuation-in-part of Ser. No. 469,128, May 13, 1974, abandoned.

[30] Foreign Application Priority Data

May 21, 1973 [CH] Switzerland ............ 7186/73

[51] Int. Cl.² ............................................. G02F 1/40
[52] U.S. Cl. ................................................ 350/357
[58] Field of Search ............................... 350/160 R

[56] References Cited

U.S. PATENT DOCUMENTS

| | | | |
|---|---|---|---|
| 3,282,159 | 11/1966 | Jones et al. | 350/160 R |
| 3,819,252 | 6/1974 | Giglia | 350/160 R |
| 3,836,229 | 9/1974 | Saurer | 350/160 R |

Primary Examiner—Robert Segal
Attorney, Agent, or Firm—Silverman, Cass & Singer, Ltd.

[57] ABSTRACT

In a sandwich type electro-optic display device which includes a transparent conductive substrate, an electrochromic layer (e.g. tungsten oxide applied to the substrate), a counterelectrode spaced from the electrochromic layer and a conductive medium, e.g. an acidic liquid ion conductive medium (sulfuric acid-glycerine solution) located in the space between the two electrodes; a protective layer deposited in situ on the electrochromic layer resulting from the doping of the liquid electrolyte with a salt of a cation having an ionic radius no less than 0.99 Angstrom units according to the classification of Pauling. Soluble isopolytungstic acid is formed at the interface between the electrochromic layer and the conductive medium as an "interfacial layer". The great cation salt selected is $Ba^{++}$ and complexes with the polyacid to form a precipitate upon said electrochromic layer to form a protective layer therefor substantially inhibiting further attack on said electrochromic layer by the acidic conductive medium.

5 Claims, 1 Drawing Figure

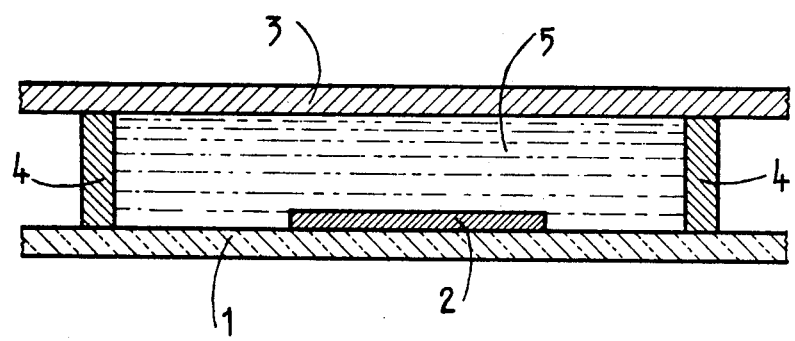

ELECTRO-OPTIC DISPLAY DEVICE

CROSS REFERENCE TO RELATED APPLICATIONS

This application is a Continuation-in-Part of U.S. Patent Application Ser. No. 685,094 filed May 10, 1976. Application Ser. No. 685,094 is a continuation-in-part of U.S. Patent Application Ser. No. 469,128 filed May 13, 1974, both now abandoned. Both this and the above identified applications are owned by the same assignee.

BACKGROUND OF THE INVENTION

The present invention relates to an electro-optic display device, especially for a timepiece, of the type which includes a transparent conductive substrate and an electrochromic layer applied on said substrate, these two elements constituting together a first electrode; a counterelectrode maintained at a distance from the said first electrode and an acidic ion conductive medium located in the space between the two said electrodes, the electrochromic layer constituting a pattern when viewed in plan. In particular, the invention is directed to the provision of a protective layer in situ deposited from the ion conductive medium upon the electrochromic layer and resulting from the introduction of a doping agent to the ion conductive medium, this doping agent being the salt of a cation having an ionic radius no less than 0.99 Angstrom according to the classification of Pauling, said layer serving to inhibit continued deterioration of the electrochromic layer by the activity of the acidic ion conductive medium.

The term "electrochromic layer" is understood to define a layer made of a material whose absorption of electromagnetic radiation in a given wavelength region is altered by application of an electric field. Such materials can show a weak absorption of the visible radiation in the absence of an electric field so that the layer is almost transparent. However, when such materials are submitted to an electric field, they absorb, for example, the red end of the spectrum so that they take a blue color. Similar effects can be observed in other portions of the spectrum of the electromagnetic radiation, visible as well as invisible.

When an electrochromic layer is deposited on a transparent conductive substrate, one can vary the optical density of such layer by applying an electric field between the electrode which is constituted by the layer and the substrate and another electrode which may be termed a counterelectrode. The space between the two electrodes may be filled by an ion conductive medium with the electrodes forming a kind of sandwich therewith. The application of a potential difference across the terminals of the two electrodes causes the electrochromic layer to pass from a clear state, for example, to a dark state (colored).

This type of sandwiched display device is known and is employed in a form of a pattern with several patterns forming a numeral. A display device comprising say, seven segments, permits, by a suitable choice of these segments, a representation to be effective of all the arabic numerals from 0 to 9. When the segments alternatively are colored and uncolored, the numerals appear and disappear successively. One terms the succession of one coloration and one uncoloration a "cycle".

When one of the components of the ion conductive medium is an acid, the edges of these segments undergo progressive erosion. Consequently, after a certain number of cycles, say several hundreds of thousands, the outlines of the segments or of any other pattern, become blurred and the width of the segments decreases so that the reading or discernability thereof becomes difficult. The present invention is intended to remove this drawback.

One type of electro-optic data display imaging device that can be formed as an arrangement with an imaging area, a counterelectrode area and a suitable ion conductive medium layer sandwiched therebetween is disclosed in U.S. Pat. No. 3,704,057 granted Nov. 28, 1972 to Lindley Clair Beegle, where a layer of conducting medium is sandwiched between the electrochromic layer deposited on a transparent conductive layer and the counterelectrode. A further improvement has been disclosed in U.S. Pat. No. 3,819,252 granted June 25, 1974 to Robert Domenico Giglia, whereby the conductive medium was transformed into a semi-solid ion conductive gel by the addition of gelling agents giving rise to better switching speeds and increased lifetime.

Giglia suggested the use as a spacing layer of a semi-solid ion conductive gel, comprising in one embodiment a combination of sulfuric acid and a gellling material for the acid.

Also the spacing layer could be made ionically conductive by semi-solid material containing some ionically conducting material as one or more salts selected from group IA and IIA alkali or alkaline earth materials, smaller ions being preferred to larger ions since their ionic mobility is larger.

Although the improvement in electrode reversibility and reproducibility obtained by the use of these gels is significant, it is applicant's experience that a semi-solid medium containing one or more salts selected from group IA and IIA alkali or alkaline earth materials do not give a sufficient contrast, which should be at least 40%. An acidic medium, should, therefore, be used, but it was found by applicant that whenever acidic media are used in the abovementioned display, whether gelified or dissolved in solvents, the material forming the electrochromic layer "is attacked" and the life-time of the display amounting to 1 to 2 millions cycles for a good image quality is insufficient to make commercial watch displays which have to display hours, minutes and seconds. (Operating at lower contrast level would give longer life-time but without fulfilling the need for good legibility of a watch display.)

SUMMARY OF THE INVENTION

In a sandwich type electrochromic data display and imaging device utilizing a transparent conductive substrate, an electrochromic layer applied to the substrate, a counterelectrode spaced from the electrochromic layer and, as a conductive medium, an acidic liquid ion conductive medium, the electrochromic layer in contact with the acid forms spontaneously, by reaction with the acid, a polyacid interfacial layer, that is, a layer located at the interface of the electrochromic layer and the ion conductive medium. This polyacid interfacial layer dissolves in the acid medium. This dissolution is, by a not well understood process, aided by cycling. The invention consists in precipitating in situ, an insoluble protective layer for the electrochromic layer consisting of an insoluble salt of the interfacial polyacid which forms the said interfacial layer.

Insoluble salts of the polyacid are formed by reaction of the polyacid interfacial layer and a cation having an ionic radius no less than 0.99 Å according to the classification of Pauling, which is added to the acidic ion conductive medium in the form of a soluble, or partially soluble, salt of an anion compatible with the medium.

The resulting insoluble layer, precipitated at the interface of the electrochromic layer and the ion conductive medium inhibits deterioration of the electrochromic layer which can be said normally to result from the dissolution of said electrochromic layer by the acidic conductive medium.

BRIEF DESCRIPTION OF THE DRAWINGS

The sole FIGURE of the drawing illustrates by way of example one embodiment of an electrochromic display device according to the invention and is a sectional view thereof.

DESCRIPTION OF THE PREFERRED EMBODIMENTS

The display device represented in the drawing comprises a transparent conductive substrate 1 formed of a plate of glass coated with an electroconductive film. An electrochromic layer 2 made of tungsten oxide is applied on the substrate 1. Layers 1 and 2 together constitute a first electrode. A counterelectrode 3 is maintained at a fixed distance from the electrochromic layer by spacers 4. Liquid acid ion conductive medium 5 such as for example, sulfuric acid dissolved in glycerine, is located in the space between the counterelectrode 3 and the electrochromic layer 2. The liquid acid ion conductive medium is conductive without addition of any additives such as salts, etc., the conduction arising from the dissociation of the acid. The conductive medium contains always some water and can in some cases contain a gelifying agent or solvent. The conductive medium can be made opaque with stable white or colored pigments.

Difficulties have been encountered in the use of display devices of this character. The electrochromic layer tends to be dissolved by the activity thereagainst of the acid conductive medium. It is believed that such a dissolution or erosion results from the fact that the action of the hydroxyl ions on the oxides of transition metals is not reversible in the presence of acids. This leads to the formation of isopoly-metalic acids such as, for example, isopolytungstic acid, when the electrochromic layer is tungsten oxide, the reactions being the following $$WO_3 + 2(OH^{31}) \rightarrow WO_4^{2-} + H_2O$$

$$WO_4^{2-} + H^{30} \rightarrow \text{isopolytungstic acid.}$$

The isopolytungstic acid so formed is soluble but remains located at the interface between the acid conductive medium and the electrochromic layer of tungsten oxide and can be described as an interfacial layer.

Salts of large cations (known as "great cations" which can be defined as those having ionic radii, according to the table of ionic radii of Pauling, as equal to or higher than 0.99 Angstrom) of polymetallic acid (polytungstic acids in the case of $WO_3$) are known to be insoluble. When these "great cations" are introduced into the ion conductive medium as a salt, soluble or partially soluble, of an anion which is compatible with this conductive medium, there is in situ deposited a precipitate upon the electrochromic layer that serves to protect the same against further acidic action, thus inhibiting deterioration of the electrochromic layer:

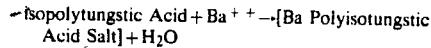

$$\text{Isopolytungstic Acid} + Ba^{++} \rightarrow [\text{Ba Polyisotungstic Acid Salt}] + H_2O$$

In a preferred embodiment, the conductive medium 5 of the display device according to the invention is doped by addition of sufficient barium sulfate to saturate said medium. Addition of sufficient barium sulfate which will remain as a precipitate in the conductive medium is feasible as well. One understands that the overall concentration of this additive which is required to effect saturation, is very small but the presence of a precipitate is not detrimental as it can be dissimulated by a pigment. It has been found that the number of cycles is increased considerably with substantial increase of the duration of life of the display device. In addition, barium sulfate has a supplementary advantage of functioning as a white pigment and, as well of increasing the speed of commutation so that the selection of barium sulfate as large cation salt has merit since advantage can be made of the presence of barium sulfate as a precipitate in the saturated medium.

Cations which can be used for doping the conductive medium in accordance with the invention, besides barium, $Ba^{++}$, include potassium, $K^+$, rubidium, $Rb_+$, caesium, $Cs^+$, calcium, $Ca^{++}$, silver $Ag^+$, thallium, $Tl^+$, strontium, $Sr^{++}$, lead, $Pb^{++}$, quaternary ammonium complex, $NR_4^+$, phosphonium ion, $PR_4^+$ and ferrocene $\pi(C_5H_5)_2Fe$.

The anionic counterpart, in the preferred embodiment, is the same as that of the acid used to make the ion conductive medium but may as well, comprise any anion which is compatible with such medium.

The following constructions by way of example were made and tested:

1. On a "Nesa" glass substrate, tungsten oxide was deposited to a thickness of 4100 Angstrom units under $2.5 \times 10^{-4}$ torr at the rate of 22 Angstroms per second. The $SnO_2$ layer not coated with $WO_3$ was protected with evaporated $SiO_x$, as specified in U.S. Pat. No. 3,836,229. The ion conductive medium comprised glycerine plus 10% of sulfuric acid saturated with tungsten oxide and was stored at 40° C. The ratio of barium sulfate to the conductive medium was 58:42, the barium sulfate acting also as pigment. The counterelectrode was formed of an alloy of stainless steel coated with a suspension of graphite in silicates and annealed at 375° C. and then treated with ammonium hydroxide at 160° C., thereafter degassed. The spacer was polyvinyl chloride and the unit was sealed with a Torr seal. The units formed above were cycled for 52 days to exhaustion, the number of cycles obtained being 4,600,000.

2. An electrochromic layer of tungsten oxide of 3200 Angstroms thickness was deposited on a substrate of "Nesa" glass (200–250 ohms per square centimeter), under $7.4 \times 10^{-4}$ torr at a rate of 5 Angstroms per second. The $SnO_2$ layer not coated with $WO_3$ was protected with evaporated $SiO_x$, as specified in U.S. Pat. No. 3,836,229. Once prepared, the ion conductive medium used was 50 cc of glycerine with 10% of sulfuric acid and calcium (0.010 Molar). The calcium sulfate was present as a pigment in a ratio 58:42. The counterelectrode used was substantially the same as used in Example 1, as was the spacer and the seal. After test, 9,374,400 cycles were achieved after three and one-half months. A similar unit without the cation additive resulted in only a maxium 1,400,000 cycles before destruction.

What I claim is:

1. In an electro-optic display device which includes a transparent conductive substrate, an electrochromic layer applied to the substrate, a counterelectrode spaced from the electrochromic layer and a liquid acidic conductive medium disposed between the electrochromic layer and the counterelectrode, the electrochromic layer having a polyacid interfacial layer which is formed spontaneously between the electrochromic layer and the conductive medium by reaction therebetween and which tends to dissolve in the presence of the acidic medium; the improvement comprising, an insoluble protective layer between the electrochromic layer and the conductive medium resulting from the doping of the liquid acidic conductive medium with a salt of a cation dopant having an ionic radius no less than 0.99 Angstroms according to the classification of Pauling, said protective layer consisting of the in situ precipitated salt product of reaction between said interfacial layer and said cation dopant, said protective layer acting to inhibit deterioration of the electrochromic layer due to dissolution of said electrochromic layer by the acidic conductive medium.

2. The electro-optic display device as claimed in claim 1 in which the cation is barium.

3. The electro-optic display device as claimed in claim 1 in which the salt is present as barium sulfate, and the concentration of barium sulfate is at least sufficient to effect a saturated solution.

4. The electro-optic display device as claimed in claim 1 in which the cation is calcium.

5. The electro-optic display device as claimed in claim 1 in which the salt is present as calcium sulfate, and the concentration of calcium sulfate is at least sufficient to effect a saturated solution.

* * * * *